United States Patent [19]
Mercuri

[11] Patent Number: 5,980,374
[45] Date of Patent: Nov. 9, 1999

[54] MEAT PRODUCT CASING AND METHOD OF SHIRRING

[76] Inventor: Enrico Mercuri, 2 Penna Avenue, Glynde, South, Australia, 5070

[21] Appl. No.: 08/737,553
[22] PCT Filed: May 10, 1994
[86] PCT No.: PCT/AU94/00243
  § 371 Date: Nov. 12, 1996
  § 102(e) Date: Nov. 12, 1996
[87] PCT Pub. No.: WO95/30334
  PCT Pub. Date: Nov. 16, 1995
[51] Int. Cl.⁶ .................................................. A22C 13/02
[52] U.S. Cl. ................................ 452/21; 452/35; 53/450; 53/553
[58] Field of Search .................... 452/37, 27, 28, 452/38, 21, 35; 53/450, 451, 546, 553, 389.2, 581, 576, 435

[56] References Cited

U.S. PATENT DOCUMENTS

| | | | |
|---|---|---|---|
| 2,922,186 | 1/1960 | Sartore | 452/35 |
| 3,306,754 | 2/1967 | Kielsmeier et al. | 452/37 |
| 3,529,401 | 9/1970 | Sartore et al. | 53/581 |
| 3,726,059 | 4/1973 | Cherio et al. | 452/35 |
| 3,805,330 | 4/1974 | Martinek | 452/27 |
| 4,086,684 | 5/1978 | Trimble | 452/28 |
| 4,155,212 | 5/1979 | Marchese | 53/581 |
| 4,307,489 | 12/1981 | Niedecker | 452/37 |
| 4,993,210 | 2/1991 | Kollross | 53/435 |
| 5,024,041 | 6/1991 | Urban et al. | 53/576 |

FOREIGN PATENT DOCUMENTS

| | | |
|---|---|---|
| 15114/62 | 9/1963 | Australia . |
| 46595/68 | 5/1970 | Australia . |
| 39916/72 | 9/1973 | Australia . |
| 10054/76 | 7/1977 | Australia . |
| 46123/93 | 12/1993 | Australia . |
| 50660/93 | 5/1994 | Australia . |
| 68233 | 1/1983 | European Pat. Off. . |
| 2801545 | 7/1979 | Germany . |
| 3814173 | 4/1988 | Germany . |
| 3741329 | 3/1989 | Germany . |
| 662543 | 10/1987 | Switzerland . |

*Primary Examiner*—Willis Little
*Attorney, Agent, or Firm*—Evenson, McKeown, Edwards & Lenahan, PLLC

[57] ABSTRACT

This invention relates to a casing (10) for use in encasing meat products. The casing (10) comprises a combination of a first tubular casing (11) which may comprise a fibrous casing material and a knitted tubular net (12) located around and substantially concentric to the first tubular member (11). The tubular net (12) comprises circumferential elastic cords (13) and longitudinal cords (14), and the relative diameter of the circumferential cords (13) to the first tubular casing (11) are such that when the casing (10) is being filled the circumferential cords (13) are placed under tension prior to the first tubular casing (11) reaching its maximum diameter. This enables the circumferential cords (13) to absorb some of the hoop stress before it is applied to the first tubular member (11) thereby preventing splitting of the first tubular member (11) which might otherwise occur without the tubular netting (12). The specification also discloses a method of shirring the casing (10) to an injection nozzle (16) which enables even spacing of the tubular net (12) around the first tubular casing (11) as the casing (10) is drawn from the injection nozzle (16). The method involves inflation of the casing (10) prior to shirring onto the injection nozzle (16).

5 Claims, 1 Drawing Sheet

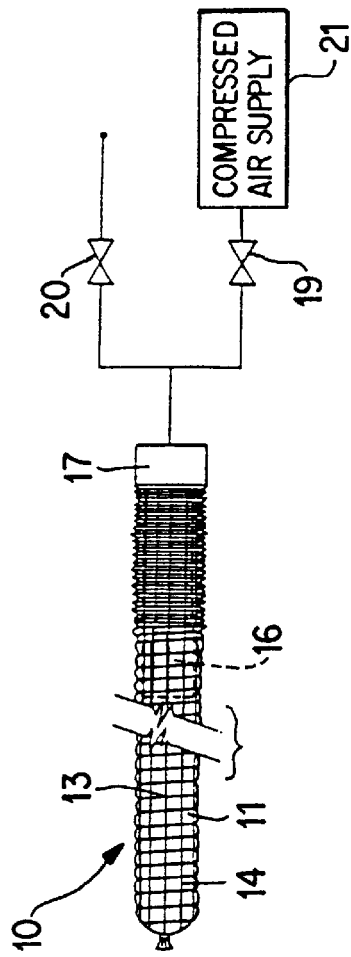
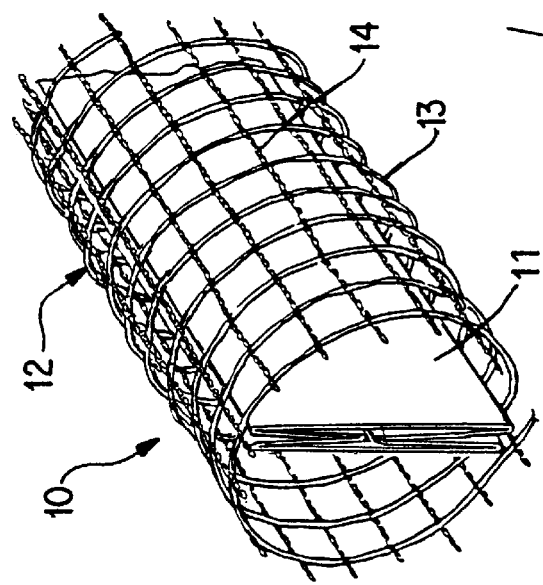
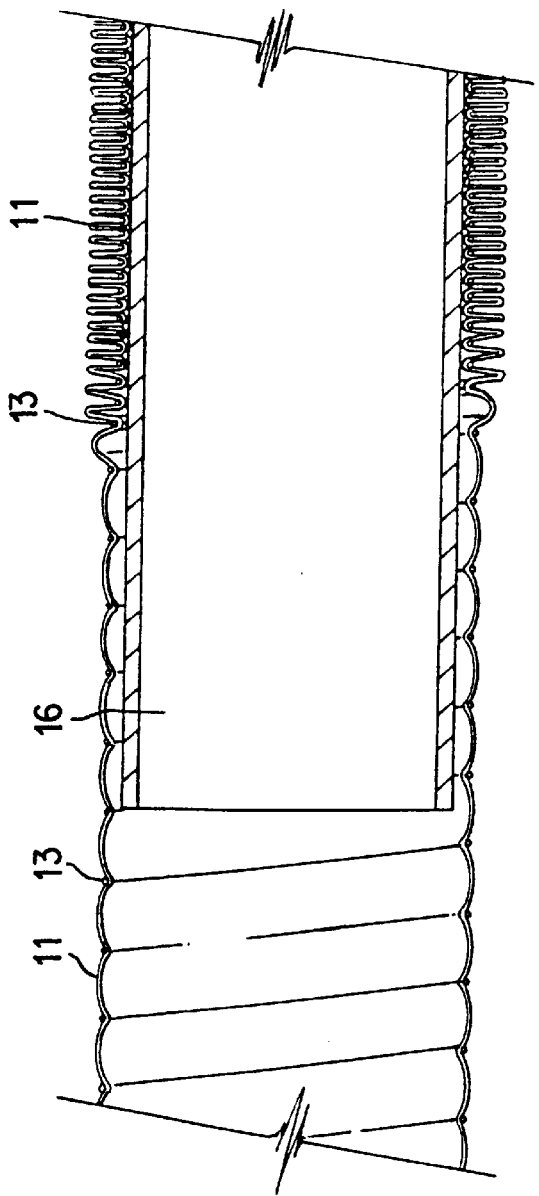

MEAT PRODUCT CASING AND METHOD OF SHIRRING

This invention relates to an improved meat casing, and in particular to a meat casing having circumferential reinforcement which enables high filling pressures to be used when filling the casing with meat.

In addition, the invention relates to an improved method of shirring meat casing where the casing is a combination of synthetic or natural tubular material within a netting material which may be knitted or woven.

In the following description, the terms "casing", "meat product" and "netting" shall have the meanings given hereunder:

"Casing" any synthetic or natural tubular material used in the processing of meat products.

"Meat product" any fresh or processed meat product.

"Netting" any knitted, woven, extruded or otherwise manufactured packaging netting whether elasticated, rigid or laterally extendable.

In the manufacture of such meat products, natural or artificial casings in the form of elongated tubes are normally pumped full of meat from a machine specifically designed for the purpose. Such a machine normally comprises a feed mechanism for injecting meat through a delivery tube or injection nozzle, where the casing is shirred to the external surface of the injection nozzle. A clip or other closure means is placed over the ends of the casing, and a quantity meat is then injected into the casing. Depending upon desired length of the meat product, the process is interrupted at various stages so that clips or twists may be applied.

In such machines it is normal to make use of artificial skins such as fibrous based casings or fibrous casings. Such casings are produced in a variety of wall thickness, and the production rate and injection pressures will determine the thickness of the casing that is used.

The thinner walled casings are generally unsatisfactory for high production rate machines. These machines operate at much higher injection pressures, and thinner casings will split at higher pressures.

However, as the thicker walled casings are much more expensive, there is a tendency to use the thinner walled casings and to reduce the injection pressure and therefore production rate of the injection machinery. Although there is a reduced costs in consumables, there is also a reduced production rate.

Therefore, it is one object of this invention to provide an improved casing which overcomes the abovementioned problems, and which provides a casing capable of withstanding higher production rate injection pressures.

String or elastic netting is well known, and is commonly used in respect of sausages and other meat products. However, such netting is normally applied after the filling of casing, and is primarily used for decorative purposes or to apply pressure during cooking.

Such netting comprises longitudinal members that are normally manufactured from inextensible materials such as cotton yarn, and also comprises a circumferential spiral of elastic material which is knitted into a tubular net.

Therefore, in a further aspect of this invention, casing is located within netting such that they are co-extensive, and such that they can be both shirred onto an injection nozzle together.

In one aspect of the invention, there is provided a casing for use with meat products comprising a combination of a first tubular casing and a tubular net, located around and substantially concentric to said first tubular member, said tubular net comprising circumferential elastic cords and longitudinal cords, the relative diameter of said circumferential cords and said first tubular casing being such that as said first casing is being filled with meat product said circumferential cords are placed under tension prior to said first tubular casing reaching its maximum diameter, such that hoop stress in said first tubular member is also resisted by said circumferential cords.

Preferably, stress is applied to the circumferential cords at a stage just prior to the maximum diameter of the first tubular casing being reached. The maximum stress is not applied instantaneously to the circumferential cords thereby reducing shock loading forces to the cords and first tubular casing.

Although the term 'circumferential cords' is used, it will be realised that preferably only a single cord is used which forms a spiral along the length of the tubular net.

Normally, the first tubular casing, such as fibrous casing is supplied in rolls in a flat and folded form. The tubular net may then be placed over such first tubular casing, or alternatively the first tubular casing may be introduced into the centre of knitting machine as the netting is being knitted.

The diameter of the circumferential cords are significantly less in the relaxed state than the maximum diameter of the first tubular casing. Therefore, as the first tubular casing is being filled the circumferential cords are gradually placed under tension until the maximum diameter of the first tubular casing is reached. At this point, instead of the first tubular casing bearing all of the induced hoop stress, the first tubular casing and circumferential reinforcing cords act together, thereby increasing the pressure that can be withstood by the first tubular casing. This in turn means that a higher injection pressure may be used, which will in turn result in a higher production rate.

In use, a single clip is used to close the end of the casing prior to injection, and again a single clip is used to close the casing after injection. Obviously, this has a significant advantage in relation to sausages which are subsequently inserted into netting, as the number of clips are reduced by two per sausage, and of course there is a considerable amount of labour saved. In addition, the clip tends to hold more firmly when the netting is between the clip and the casing.

It is important that as the casing is being filled, the netting is evenly spaced with respect to the external surface of the filled first tubular casing. Therefore, as the first tubular casing and netting in the combined form will be shirred onto an injection nozzle, it is important that they are both shirred in a manner which will enable the first tubular casing and netting to be drawn away from the injection nozzle such that the circumferential cords are spaced evenly with respect to the external surface of the first tubular casing. Therefore, it is an object of a further aspect of this invention to provide a method by which the netting can be shirred together with the first tubular casing to ensure even spacing of the netting with respect to the first tubular casing as it is drawn from the injection nozzle.

Therefore in a further aspect of this invention, there is provided a method of shirring a casing as described above onto an injection nozzle comprising sealing one end of said casing in an air tight manner, locating the other end of said casing over said injection nozzle, inflating said casing to its full diameter such that said circumferential cords are partly extended and evenly spaced along said inflated casing and pushing said inflated casing onto said injection nozzle such that the portions of said first tubular casing between adjacent circumferential cords folds upwardly so that said first tubular casing concertinas onto said injection nozzle.

The upward fold of first tubular casing forms a spiral which is located between the circumferential cords of the netting. The netting will be evenly spaced with respect to the first tubular casing such that as the shirred casing is drawn from the injection tube during use, the netting will be evenly spaced on the resultant product.

Preferably the circumferential cords press inwardly against the surface of the inflated first tubular casing so that they are at a smaller diameter than the first tubular casing which assists in the upward folding.

It is important that the first tubular casing be supple at the time of shirring the casing onto an injection tube such that the first tubular casing will be inclined to fold upwardly between the circumferential cords. Preferably, fibrous casing is used which is moistened to provide the required suppleness. However, other casing materials may have the required suppleness without being wetted. Further, the preferred knitting process results in a single cord being knitted into a spiral to form the circumferential cords. However, this aspect of the invention will be equally workable with circumferential loops.

Preferably the injection nozzle attaches to an air supply means to allow inflation of the first tubular casing, and an air pressure control means allows for relief of air pressure as the casing is shirred onto the injection nozzle. In addition, the injection nozzle may have a smaller diameter than the diameter of the circumferential cords over the inflated first tubular member. This minimises the friction between the casing and nozzle during the shirring process.

In order that the invention may be fully understood, a preferred embodiment will now be described, but it should be realised that the scope of the invention is not to be restricted to the precise details of this embodiment. The embodiment is illustrated in the accompanying representations in which:

FIG. 1 shows the combination of a first tubular casing and a tubular net (for illustrative purposes, the tubular net is shown at its relaxed diameter around the first tubular casing. However, prior to use, the tubular net will normally lie in a flattened form around the first tubular casing.), FIG. 2 shows a schematic representation of the casing being shirred onto an injection nozzle with associated air supply and air control means, and FIG. 3 shows a cross-sectional view of the casing and injection nozzle during the shirring process.

In this embodiment, the casing 10 comprises a first tubular casing 11 and a tubular net 12 which is located around and substantially concentric to the first tubular member 11.

In this embodiment, the first tubular casing 11 comprises a fibrous material, which as shown in FIG. 1 is folded to a flat form. The tubular net 12 comprises circumferential cords 13 and longitudinal cords 14. In this embodiment, the circumferential cords 13 comprise a single strand of elastic material bound by poly/cotton that extends along the tubular net 12 in a spiral. The longitudinal cords 14 comprise inextensible knitted poly/cotton cords.

According to this invention, the process of producing the casing 10 comprises introducing the first tubular casing 11 into the centre of the knitting machine as the tubular net 12 is being knitted. The first tubular casing 11 advances through the knitting machine at a rate equal to the production of the tubular net 12. This production method avoids the necessity of feeding the first tubular casing 11 into a pre-prepared tubular net, and enables relatively constant spacing between the adjacent circumferential and longitudinal cords 13 and 14 with respect to the first tubular casing 11. FIG. 1 shows the tubular net 12 in circular form at a diameter where there is no extension of the circumferential cords 13. This illustration shows more clearly the foldline of the first tubular casing 11, but after knitting of the tubular net 12 will lay flat over the first tubular casing 11.

As can be seen from FIG. 1, the overall circumference of the first tubular casing 11 is much larger than the circumference of the tubular net 12. In this embodiment, the first tubular casing 11 has a circumference of approximately 3 times that of the tubular net 12. Therefore, as the first tubular casing 11 is being filled, the circumferential cords 13 are being elastically extended which results in hoop stress in the first tubular member 11 also being resisted by the circumferential cords 13. Therefore, when the first tubular casing 11 reaches its maximum diameter, there is a significant resistance being applied by the circumferential cords 13. Not only does this assist in increasing the strength of the casing 10 but also means that during the cooking or curing process, the circumferential cords 13 will impart a compressive force to the meat product within the casing 10, and will ensure that the first tubular casing 11 is forced inwardly as the meat product within the casing 10 shrinks.

Obviously, the casing 10 is produced in relatively long lengths, and it is conventional practice in the relevant industry to shirr such casing onto an injection nozzle prior to the filling process. The casing can then be drawn from the injection nozzle as it is being filled. Conventionally, prior to the filling process, the casing has a clip applied to the end so as to close it, whereupon the injection process commences. As the meat product is extruded through the injection nozzle, the required amount of casing is automatically withdrawn. At various intervals, the injection process is halted, whereupon further clips or twists can be applied. This produces meat products of the required length.

Obviously, it is a requirement that the tubular net 12 be evenly spaced over the surface of the first tubular casing 11 upon it being filled. In order to achieve this, a method of shirring as illustrated in FIGS. 2 and 3 is used.

Prior to the shirring process, the first tubular casing 11, which comprises a fibrous casing, is moistened so as to soften it. This is best achieved by immersing the casing 10 in water. This results in the fibrous becoming extremely soft and pliable.

As seen in FIG. 2, one end of the casing 10 is located over the injection nozzle 16 with the other end being clipped closed so that it is air tight. The injection nozzle 16 is secured to a mandrel 17 which is attached to a compressed air supply via valve 19. Parallel to valve 19 is a second air pressure control means which comprises a relief valve 20. Once the casing 10 is located on the injection nozzle 16 it can be inflated by opening valve 19 and supplying air pressure through the injection nozzle 16. Normally, the injection tubes 16 can only carry a given quantity of casing 10, and therefore it is quite possible to inflate the required length of casing 10 prior to the shirring process.

As seen in FIG. 3, the first tubular casing 11 which is inflated to its maximum diameter causes extension of the circumferential cords 13. This results in the circumferential cords 13 compressing into the inflated first tubular casing 11, such that the diameter of the circumferential cords 13 is slightly less than the diameter of the first tubular casing 11 between the adjacent circumferential cords 13. This slight extension of the first tubular casing 11 away from the circumferential cords 13 induces the first tubular casing 11 to fold outwardly as the casing 10 is shirred onto the injection nozzle 16. As the tubular net 12 is evenly spaced upon inflation of the first tubular casing 11, this spacing does not alter significantly during the shirring process, and the first tubular casing 11 folds onto the injection nozzle in a concertina like manner, which results in compact packing of the casing 10 onto the injection nozzle 16.

Likewise, as the meat product is being injected through the injection nozzle 16, the casing 10 is withdrawn as required, with the tubular net 12 evenly spaced over the outer surface of the first tubular casing 11.

The compressed air supply 21 inflates the first tubular casing 11 via relief valve 19 and the mandrel 17. Upon the shirring process commencing, the valve 19 is closed, and the relief valve 20 operated so that as the inflated casing 10 locates on the injection nozzle 16, excess air is able to vent through the relief valve 20.

As shown in FIG. 3, the diameter of the injection nozzle 16 is slightly less than the diameter of the circumferential cords 13 around the inflated first tubular casing 11. This provides a clearance between the first tubular casing 11 and injection nozzle 16 as the first tubular casing 11 moves over the external surface of the injection nozzle 16. This allows for easier shirring as a result of the reduced friction.

While the first tubular casing 11 is still supple, the injection nozzle 16 at the completion of the shirring process is then fitted to a meat injection machine, and the filling process commenced. Alternatively, the shirred casing 10 may be allowed to dry for use at a later stage. In this case, the shirred casing 10 is simply immersed in water, until it is fully supple and then located onto a filling machine.

In this embodiment, it is unnecessary to adhere the tubular net 12 to the external surface of the first tubular casing 11. The manufacturing process results in the tubular net 12 being evenly spaced with respect to the first tubular casing 11, and in addition the shirring process also ensures even spacing during the filling process.

From a consideration of the above description, it would be clear that the various aspects of this invention provide significant advantages in respect of both the casing concerned and the method of shirring the casing. Additional advantages result from the casing being able to reduce in diameter as the meat product shrinks during cooking or curing process. The elastic circumferential cords will cause the fibrous casing to contract thereby ensuring that the casing will always firmly adhere to the surface of the meat product. The claims defining the invention are as follows:

I claim:

1. A casing for use with meat products comprising:
   a first tubular casing, and
   a tubular net located around and substantially concentric to said first tubular casing,
   said tubular net comprising circumferential elastic cords and longitudinal cords, said first tubular casing having a circumference which is between 2 and 4 times greater than a circumference of the tubular net so that, as said first tubular casing is being filled with meat product, said circumferential elastic cords are elastically extended and placed under tension, prior to said first tubular casing reaching its maximum diameter, such that hoop stress in said first tubular casing is also resisted by said circumferential cords,
   said circumferential elastic cords comprising a spiral extending along the length of said tubular net.

2. A casing for meat products in which a length of said casing is drawn onto an injection nozzle of a meat injection machine so that a required amount of casing is drawn off said injection nozzle as meat is injected into the casing, said casing comprising:
   an outer tubular net, and
   an inner casing extending along a length of said outer tubular net,
   said tubular net comprising a plurality of spaced longitudinal cords and circumferential elastic cords comprising a spiral elastic cord secured to said longitudinal cords at each intersection of said cords, said inner casing having a circumference which is between 2 and 4 times greater than a circumference of the tubular net so that said circumferential elastic cords are elastically extended and placed in tension, remain in tensions, and apply a constant compressive force to a surface of said inner casing as said casing is drawn off said injection nozzle throughout a filling process.

3. A casing according to claim 2 wherein said tubular net is located around said inner casing without being adhered to its outer surface.

4. A casing according to claim 2 wherein said tubular net is produced in a continuous knitting process with said inner casing fed through a knitting machine and introduced within said tubular net as it is knitted.

5. A casing according to claim 4 wherein said inner casing is folded so that it is flat with at least one pleat to reduce the width of said inner casing so that it fits within said tubular net when said circumferential elastic cords are unextended.

* * * * *